Dec. 1, 1953     O. S. FRENCH     2,660,906
IDLER ARM
Filed Feb. 25, 1950
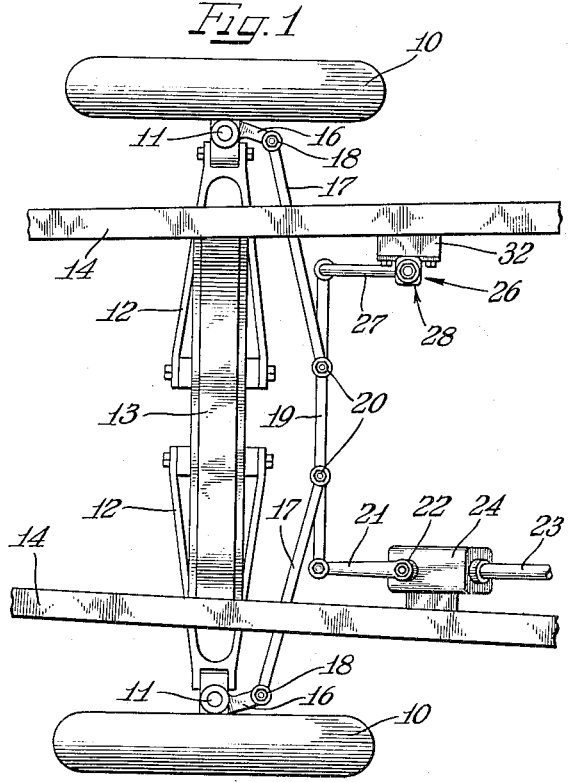
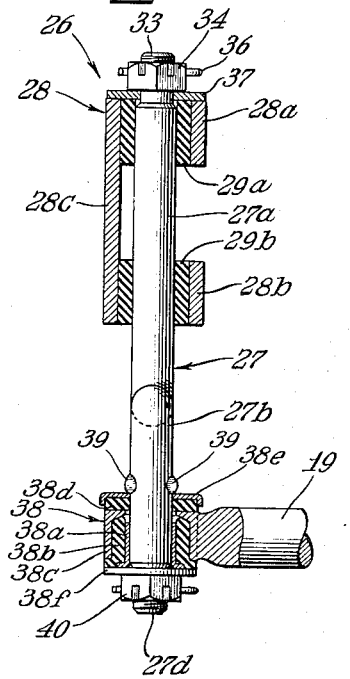
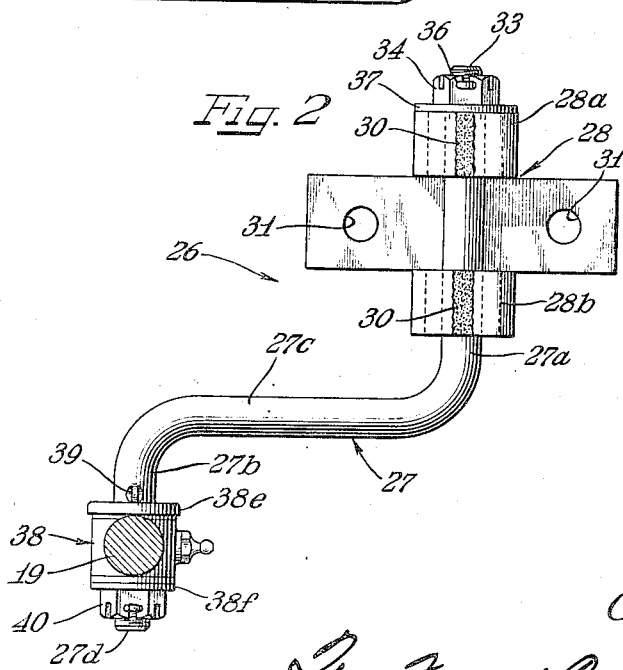
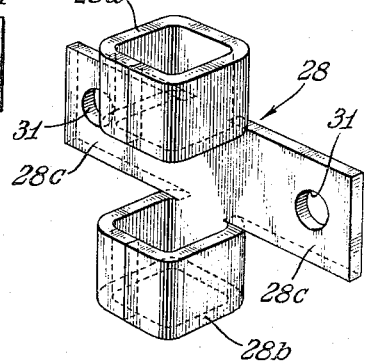
Inventor
Oliver S. French
by [signature] Attys Patented Dec. 1, 1953

2,660,906

UNITED STATES PATENT OFFICE 2,660,906

IDLER ARM

Oliver S. French, Detroit, Mich., assignor to Thompson Products, Inc., Cleveland, Ohio, a corporation of Ohio Application February 25, 1950, Serial No. 146,192

7 Claims. (Cl. 74—579)

This invention relates generally to a vehicular steering assembly and more particularly relates to an idler arm construction employed to connect the free end of the cross link in a parallelogram-type steering linkage on a dirigible vehicle such as an automobile to the frame thereof.

In a parallelogram-type steering linkage, a cross link extending transversely of the automobile frame is actuated at one end by a pitman arm operated through a gear box situated on the end of the steering column. The other end of the cross link must be adequately supported to maintain the linkage in proper geometric relationship relative to the front wheels as well as to insure that steering loads will be transmitted through a change of direction.

In accordance with the general features of the present invention, an idler arm is provided having a novel bearing about which the idler arm pivots. The bearing is attached to the vehicle by means of a bracket formed from a plate of steel. A plurality of bearing retainers are formed by curling spaced apart ears defined by the plate of steel to form enclosed spaces. One arm of a generally crank-shaped idler arm is inserted within the enclosed spaces and a bushing of elastic resilient material such as rubber or synthetic rubber, or other rubber-like material serves as a bearing between the idler arm and each of the bearing retainers of the bracket.

Relative angular displacement of the idler arm produces only torsional movement in the bushings.

It is an object of the present invention, therefore, to provide an idler arm structure for a vehicular steering linkage which incorporates a novel bearing about which the idler arm pivots.

Another object of the present invention is to provide a bearing for an idler arm of a vehicular steering linkage wherein a bushing of resilient elastic material serves as a bearing between a journal member and a bearing block so that relative angular displacement thereof will produce only a torsional movement in the bushing.

Yet another object of the present invention is to provide an idler arm construction which will preclude the magnification and transmittal of rattling noises originating in the steering linkage.

Another object of the present invention is to provide a bearing for an idler arm employed in a vehicular steering linkage which may be permanently assembled to the idler arm and which requires no lubrication.

A further object of the present invention is to provide an idler arm assembly for a vehicular steering linkage which may be fabricated from a reduced number of simplified parts with great economy.

An additional object of the present invention is to provide a process of making an idler arm structure which is economical and which results in the production of a structure completely efficient for its intended purpose.

Another object of the present invention is to provide a method for connecting the free end of a cross link in the parallelogram-type vehicular steering linkage to the frame of the vehicle.

Many other features, advantages and additional objects of the present invention will become manifest to those versed in the art upon making reference to the detailed description which follows and the accompanying sheets of drawings, in which:

Figure 1 is a fragmentary top plan view of an automobile chassis having a parallelogram-type steering linkage equipped with an idler arm structure according to the present invention;

Figure 2 is an enlarged elevational view, with parts in cross section, of the idler structure of the present invention;

Figure 3 is an enlarged end elevational view of the idler arm structure shown in Figure 2 with parts of the bracket and bearing structure shown in vertical cross-section to illustrate additional details of construction, and Figure 4 is a perspective view of the bracket employed in the present invention showing details of construction of the bearing block or housing formed thereby.

As shown on the drawings:

Referring first to Figure 1, a front wheel suspension and vehicular steering assembly is shown which includes a pair of wheels 10, 10 supported for rotation on sub-axles (not shown) and pivoted on king pins 11, 11. The wheels 10, 10 are supported by wheel arms 12, 12 which are pivotally connected to the transverse beam 13 of a vehicular frame which also includes side beams 14, 14.

A pair of steering arms 16, 16 extend rearwardly from the sub-axle assembly of the wheels and a pair of tie rods 17, 17 are pivotally connected to the steering arms 16, 16 through a ball and socket type joint as at 18, 18.

The tie rods 17, 17 extend inwardly and are connected by a cross link 19, the points of connection including appropriate ball and socket-type joints 20, 20.

One end of the cross link is pivotally connected to a pitman arm 21 which is swung by a rock shaft 22 upon rotation of a steering column 23 operatively connected thereto through a gear box 24 firmly secured to the side beam 14 adjacent thereto.

The other end of the cross link 19 is movably connected to the side beam 14 adjacent thereto by means of an idler arm assembly indicated generally by the reference numeral 26 so that the vehicular steering linkage will be supported in the proper geometric relationship and so that steering loads may be transmitted through a change of direction.

In accordance with the present invention and referring more specifically to Figures 2, 3 and 4 it will be noted that a generally crank-shaped idler arm 27 is provided which may comprise an ordinary bar of commercially available bar stock suitably bent to define parallel oppositely extending arm portions 27a and 27b with an intermediate arm portion 27c so as to bring the free end of the cross link 19 into proper relationship with a bearing connected to the frame, the structure of which will now be described in greater detail.

The bearing referred to is attached to the vehicle by means of a bracket indicated generally by the reference numeral 28. The bracket 28 preferably takes the form of a plate of metal which may be appropriately sheared to define a plurality of spaced ears disposed in parallel rows and extending in opposite directions. A plurality of resilient, elastic sleeve-like bushings surround portions of the arm 27a of the idler arm 27 in spaced apart relationship to one another, for example, as shown in this embodiment, a pair of bushings are provided which are indicated by the reference numerals 29a and 29b.

These bushings are retained by bearing blocks or housings which are formed by curling a corresponding number of pairs of ears of the bracket 28, for example, the ears 28a and 28b, around the bushings 29a and 29b, respectively. In this preferred embodiment, the curled ears define enclosed spaces having a round-cornered square cross-section and the ears 28 and 28b may be retained in this position by means of a braze or a weld indicated by the reference numeral 30 (Figure 2).

As shown in Figures 2 and 4 the remaining pair of ears indicated by the reference numeral 28c, 28c may be apertured as at 31 to receive suitable fastening means for attaching the brackets 28 to the side beam 14 adjacent thereto or to a protuberance 32 affixed to the side beam 14.

In operation the idler arm 27 will normally be displaced angularly through an arc of approximately 90°. The movement of the idler arm, however, will produce no movement between the bearing surfaces, but will produce only a torsional movement in the bushings 29a and 29b.

Because no finishing operations are required to define finely machined bearing surfaces, it is possible to employ an idler arm made from commercially available metal bar stock. The absence of movement between bearing surfaces also precludes the necessity of providing lubrication for the bearing.

Although the frictional contact between the idler arm 27, the bushings 29a and 29b and the housings 28a and 28b will normally operate to prevent axial movement of the idler arm 27 with respect to the bearing, for reasons of safety the idler arm 27 is locked relative to the bracket 28 by appropriate locking means.

In this particular embodiment, the end of the arm 27a and idler arm 27 is threaded as at 33 to receive a nut 34 which may be locked in place by a cotter pin 36. The nut 34 retains a washer 37 in abutting relationship relative to the housing 28a.

The arm 27b of the idler arm 27 is connected to the cross link 19 by means of a rubber bushed metal sleeve bearing indicated generally by the reference numeral 38. The bearing 38 as shown in Figure 3 includes a metal bearing sleeve 38a receiving the end portion 27b of the arm 27 in rotatable relation therethrough. The sleeve 38a is surrounded by a rubber bushing 38b which in turn is encased in an eye end housing 38c of the cross link 19. A rubber washer 38d overlies the housing 38c and is covered by a metal case 38e. The arm portion 27b has a threaded end 27d projecting below the housing 38c and a washer 38f on this end underlies the housing 38c. The assembly 38 is retained in proper alignment on the arm portion 27b by means of pinched out ears 39 formed on the arm 27b and by a locking medium indicated generally by the reference numeral 40 and including a castellated nut threaded on the end 27d and secured in place by a cotter pin. The connection between the idler arm 27 and the cross link 19 serves to snub rotation of the cross link 19 about the axis of the idler arm while permitting misalignment which causes deflection of the elastic bushings 29a, 29b. It will be appreciated that the actual steering motion occurs between the metal bearings 38 and the idler arms 27.

Because the idler arm 27 is effectively cushioned in the elastic bushings rattling noises which frequently originate in a vehicular steering linkage will not be magnified or transmitted by the elements of the assembly. Furthermore, the structure of the present invention does not necessitate the use of expensive drop forgings or other complicated elements and may be produced with great economy.

It is contemplated that various persons skilled in the art might suggest certain minor modifications in the preferred embodiment herein described in great detail by way of illustrative example only, however, it should be understood that I wish to include within the scope of this patent all such embodiments as reasonably and properly come within the scope of my contribution to the art.

I claim as my invention:

1. An idler arm structure for a vehicular steering assembly comprising an idler arm, a plurality of resilient elastic bearings at spaced intervals along the length of a portion of the idler arm, a bracket plate, a plurality of ears in the bracket plate in spaced apart relationship to one another, the ears being shaped around the spaced bearings to surround the same in snug relationship therewith, whereby rotative displacement of the idler arm relative to the bracket plate will produce only torsional movement in the bearings.

2. An idler arm structure for a vehicular steering assembly comprising an idler arm, a plurality of resilient elastic bearings at spaced intervals on a portion thereof, a bracket plate, a plurality of ears in the bracket plate in spaced apart relationship to one another, the ears being shaped around the spaced bearings to surround same in snug relationship therewith, and means to hold the abutting edges of the bracket plate ears together to lock same in surrounding relationship to the bearings, whereby rotative displacement of the idler arm relative to the bracket plates will produce only a torsional movement in the bearings.

3. An idler arm structure for a vehicular steering assembly comprising a piece of bar stock formed to the general configuration of a crank and comprising an idler arm, a plurality of resilient elastic bearings surrounding a portion of the idler arm, a plurality of housings defined by a bracket plate surrounding the bearings and locking means defined by the housings of the bracket plate to retain same in snug surrounding relationship to the bearings whereby angular displacement of the idler arm relative to the bracket plate will produce only a torsional movement in the bearings.

4. An idler arm structure for a vehicular steering assembly comprising a piece of bar stock formed in the general configuration of a crank to define an idler arm, a plurality of rubber-like bearings surrounding a portion of the idler arm, flat metal plate comprising a bracket with a plurality of ears curled around each of the bearings to surround the same in snug relationship therewith and locking means between the idler arm and the bracket to preclude relative axial movement therebetween, whereby angular displacement of the idler arm relative to the bracket plate will produce only a torsional movement in the bearings.

5. A bearing structure comprising an angularly displaceable member, a plurality of bearings made of resilient elastic material on the angularly displaceable member at spaced intervals along the length thereof and a support element having a plurality of spaced apart housing portions each snugly surrounding one of said bearings, whereby displacement of the angularly displaceable member will produce only torsional movement in the bearings.

6. An idler arm assembly comprising an idler arm, a plurality of rubber-like bearings spaced apart from one another on the idler arm, and a support bracket defining a plurality of spaced ears disposed in parallel rows and extending in opposite directions, at least a number of pairs of said ears corresponding to the number of bearings being curled around said bearings and forming housings therefor and at least one pair of the remaining ears being apertured to receive fastening means therethrough to secure the bracket to a vehicle frame.

7. An idler arm assembly comprising an idler arm, a plurality of rubber-like bearings spaced apart from one another on the idler arm, and a support bracket defining a plurality of spaced ears disposed in parallel rows and extending in opposite directions, at least a number of pairs of said ears corresponding to the number of bearings being curled around said bearings and forming housings therefor and at least one pair of the remaining ears being apertured to receive fastening means therethrough to secure the bracket to a vehicle frame, the bearing housings and the bearings defining a cross-sectional configuration corresponding to a round-cornered square.

OLIVER S. FRENCH.

References Cited in the file of this patent

UNITED STATES PATENTS

| Number | Name | Date |
|---|---|---|
| 131,671 | Eils | Sept. 24, 1872 |
| 1,721,288 | Thirty | July 16, 1929 |
| 1,778,197 | Lord | Oct. 14, 1930 |
| 1,855,376 | Anton | Apr. 26, 1932 |
| 1,985,781 | Hufferd et al. | Dec. 25, 1934 |
| 1,991,579 | Sampson | Feb. 19, 1935 |
| 2,152,506 | Thorne | Mar. 28, 1938 |
| 2,156,580 | Best | May 2, 1939 |
| 2,269,170 | Allenby | Jan. 6, 1942 |
| 2,448,851 | Wharem et al. | Sept. 7, 1948 |
| 2,464,982 | Leighton | Mar. 22, 1949 |
| 2,470,215 | Graham | May 17, 1949 |
| 2,479,339 | Gair | Aug. 16, 1949 |
| 2,488,979 | Kogstrom | Nov. 22, 1949 |

FOREIGN PATENTS

| Number | Country | Date |
|---|---|---|
| 396,377 | Great Britain | July 31, 1933 |
| 465,635 | Great Britain | May 11, 1937 |